United States Patent [19]
Baumgarten

[11] Patent Number: 5,190,771
[45] Date of Patent: Mar. 2, 1993

[54] SCREW EXTRUDER
[75] Inventor: Wilfried Baumgarten, Pattensen, Fed. Rep. of Germany
[73] Assignee: Kraftanlagen AG, Heidelberg, Fed. Rep. of Germany
[21] Appl. No.: 689,447
[22] Filed: Apr. 22, 1991
[30] Foreign Application Priority Data
Apr. 20, 1990 [DE] Fed. Rep. of Germany ....... 4012612
[51] Int. Cl.⁵ ............................................. B29C 47/00
[52] U.S. Cl. .................................... 425/171; 264/349; 366/80; 366/90; 425/208
[58] Field of Search ..................... 366/80, 90; 425/171, 425/208, 209; 264/349

[56] References Cited
U.S. PATENT DOCUMENTS

| | | | |
|---|---|---|---|
| 1,848,236 | 3/1932 | Anderson | 241/167 |
| 3,870,285 | 3/1975 | Bausch et al. | 366/80 |
| 4,178,104 | 12/1979 | Menges et al. | 366/80 |
| 4,629,326 | 12/1986 | Huls | 366/80 |
| 4,629,327 | 12/1986 | Capelle | 366/90 |
| 4,696,575 | 9/1987 | Upmeier | 366/80 |
| 4,723,901 | 2/1988 | Sarumaru | 366/80 |
| 4,735,565 | 4/1988 | Capelle | 366/80 |
| 4,960,328 | 10/1990 | Schumacher et al. | 366/90 |

FOREIGN PATENT DOCUMENTS

| | | | |
|---|---|---|---|
| 734823 | 5/1966 | Canada | 366/90 |
| 2171636 | 9/1986 | United Kingdom . | |

Primary Examiner—Jay H. Woo
Assistant Examiner—Scott Bushey

[57] ABSTRACT

Screw extruder for working plastic compositions, especially polymers and rubber mixtures having a cylinder in which a motor-driven screw is disposed. The cylinder being provided with pins which are disposed in planes perpendicular to the cylinder axis and can be pushed radially through openings in the cylinder wall, and the screw being provided in the pin planes with gaps in the screw spirals. The object of the invention is to create a practically achievable and economical possibility for the shifting and depth adjustment of pins in screw extruders. A plurality of pins, lying in an axis parallel row, are fastened to a beam at the extremities projecting from the extruder cylinder.

8 Claims, 4 Drawing Sheets

SCREW EXTRUDER

BACKGROUND OF THE INVENTION

The invention relates to a screw extruder for working plastic compositions, especially polymers and rubber mixtures, consisting of a cylinder in which a motor-driven screw is disposed, the cylinder of which is provided with pins which are arrayed in several planes perpendicular to the cylinder axis and can be inserted radially through openings in the cylinder wall, and the screw is provided in the spirals of the screw with gaps disposed in the planes of the pins.

Such screw extruders are disclosed in German Patent 137,813 and U.S. Pat. No. 1,848,236. The pins extending radially into the extruder cylinder improve the kneading and mixing of the material, and in many cases they have made such kneading and mixing possible for the first time.

When the screw is changed and when the extruder is to be cleaned these pins have to be removed and then reinstalled. When the pins are threaded in place it becomes possible to adjust their depth, which is done for the purpose of reducing the screw resistance by having the pins reach less deeply into the cylinder and to improve the kneading and mixing action by setting the pins deeper.

Occasionally there is a desire to be able to vary the pin depth rapidly and without consuming too much time between zero and maximum for reasons relating to the process. Pin extruders for working rubber mixtures which are not preheated have attained great economical importance when constructed in accordance with German Patent 22 35 784. The mechanical fine pin adjustment operating with spiral plates is rarely used, however, for reasons of cost. The movement of, for example, eight pins in a single pin plane also requires considerable power and thus causes great wear on the adjusting means. For the numerous pin planes, amounting to about six to sixteen planes, this adjustment is furthermore quite time-consuming. Therefore there is a need for a rapid adjustment of the pins for the purpose of losing as little time as possible when the screw has to be replaced for technical reasons with one of a different shape, or because it is worn, or for cleaning purposes.

German Patent 35 03 911 has disclosed a hydraulic pin adjustment which permits the pins to be driven all the way in and backed all the way out, each pin being constituted by the plunger of a hydraulic cylinder. For each pin a separate hydraulic cylinder is provided. The possibility of achieving specific, defined pin depth settings has been practically unattainable on account of the immensely great complexity of the controls required. Even the complete plunging and extraction of the pins is so structurally complex that such hydraulic pin control has not become established to any great extent.

A pin adjuster that appears to be mechanically very simple, and which theoretically also offers the possibility of any desired depth adjustment, has been disclosed by German Patent 35 06 424. The disadvantage of this type of construction using Kellen drives for the screw movement producing the axial movement of the pins lies in the fact that extremely great friction is involved, which renders unfunctional any design based on this principle, and therefore it has never been used in actual practice.

The present invention avoids the disadvantages of the state of the art. It is the aim of the invention to create a practically usable and economical possibility for rapid pin movement and depth adjustment on screw extruders.

THE INVENTION

The invention consists in fastening a plurality of pins situated in an axis-parallel row with the ends that project outwardly from the extruder cylinder fastened to a beam.

The radially disposed pins of an extruder cylinder or battery of extruder cylinders are driven in common in rows, as seen in the axial direction, each row having a longitudinal beam to which the pins of a row are fastened. This movement of the pins coupled to a beam can be performed either mechanically by means of levers or cams, or screws or other common machine elements. Preferably, however, each beam will be driven by servo motors, using either pneumatic or hydraulic or even electromechanical servo motors; in other words, pneumatic or hydraulic piston-and-cylinder units, or spindles driven by electric motors or hydraulic power, for example. Since these elements act each on an entire row of pins, the result is a considerable saving in cost, great uniformity in the selected depth adjustment, and a reliable control of the pin depth. If a conventional extruder cylinder has, for example, eight pins in a plane, and has, for example, twelve planes of pins, it does not need 96 hydraulic cylinders plus complicated controls and coupling means, but only eight adjusters for the eight beams bearing these three rows of pins.

So that the beams will be displaceable not only parallel to the extruder cylinder axis, but also to a position at an angle to this axis (which has the advantage that at each radial plane the pins plunge deeper into the cylinder and thus the working of the material being extruded becomes gradually more intensive), a form of construction is desirable in which the pins are fastened to the beam by a joint or by means of studs guided in slots.

By the use of these beams a considerable saving of space is achieved, because the number of actuators needed for the beam is considerably less than the number of actuators for the pins controlled individually, each by one hydraulic cylinder, in the state of the art. This is because in the case of twelve pin planes, for example, ten hydraulic cylinders are eliminated, to say nothing of the hoses leading to them. To save even more space, it is desirable to arrange the servo motors between two pins and fasten them to the beam.

It is desirable for scales and measuring means to be disposed alongside the path of movement of the beam, or to provide transducers which sense the position of the beam. By using mechanical scales or electrical transducers it is thus possible to know whether the pins are fully in or out, or at what depth they are located. Precisely at a medium depth it is quite easy to control or monitor, for example, eight actuators in common, whereas in the case of 96 hydraulic cylinders, the set depth cannot be observed at all, or only with enormous effort. For precisely in actual practice it may be important to set the depth of penetration of the pins to different depths in the driving direction of the extruder. If, for example, the material being worked is so extremely tough or viscous that pins might be broken, it is desirable to reduce the pin depth of the first plane of pins and, by angling the beams, to set the penetration depth in the axial direction from a minimal initial value to a maximum value.

In many cases it may also be desirable to provide stop means for a parallel or angled setting of the beams. In the use of these beams it is also easily possible to set the beams for different depth adjustments and angles.

BRIEF DESCRIPTION OF THE DRAWINGS

The essence of the invention will be further explained below with the aid of embodiments represented diagrammatically in the drawing, wherein.

DETAILED DESCRIPTION

Figure 1:
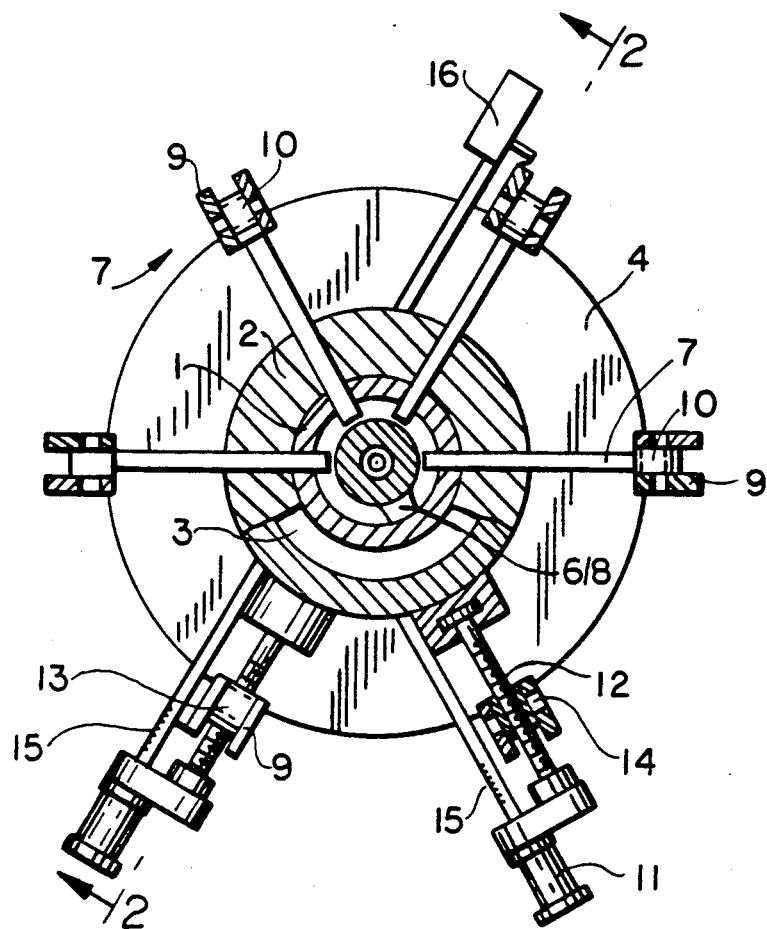
FIG. 1 is a cross section through an extruder cylinder with an electromechanical adjustment of the beams.
Figure 2:
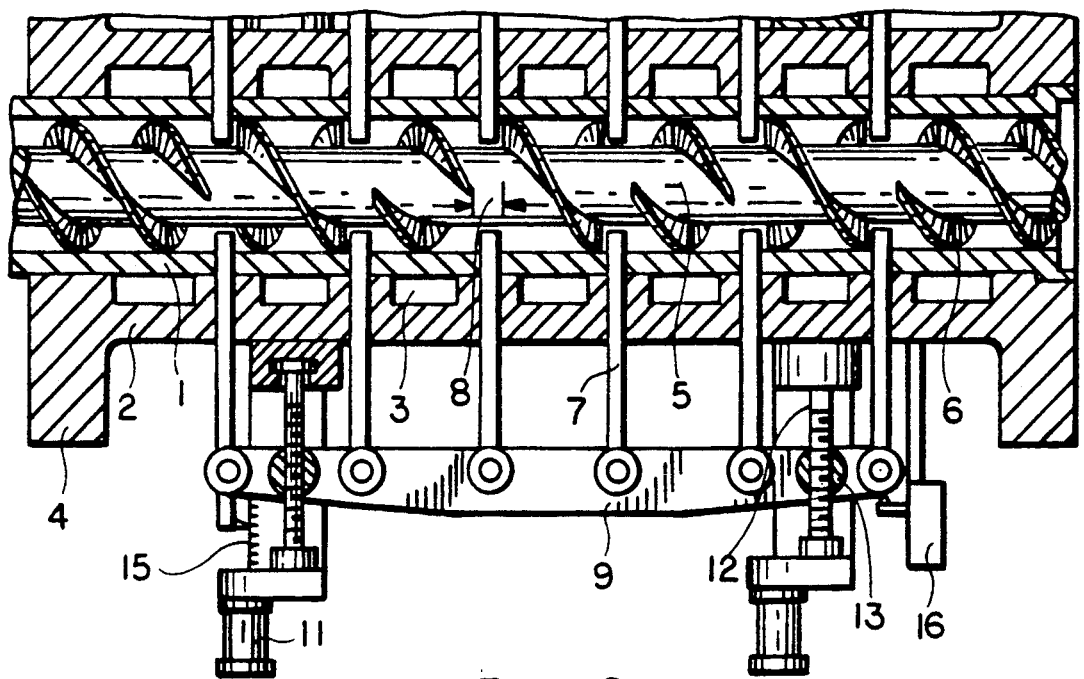
FIG. 2 is a radial section taken through the extruder cylinder of FIG. 1 along the lines 2—2.

The cylinder 1 of the extruder is inserted into a jacket 2 which has cooling passages 3 and flanges 4. In this cylinder 1 is inserted a screw 5 with spirals 6. This screw is motor-driven. The cylinder 1 has radial openings through which pins 7 extend which protrude into the inner space of the cylinder 1. For this reason the spirals 6 of the screw 5 have gaps 8.

The pins 7 of each pin row seen in the axial direction of the cylinder are fastened through joints 10 to a common beam 9. Spindles 12 driven by an electric motor 11 are engaged in spindle nuts 13 which are mounted in joints 14 on the beam 9. By rotating the spindles by electric motors the beams can be shifted to various distances from the cylinder axis, parallel to the latter or at an angle thereto. In this manner the depth of penetration of the pins 7 can be set differently and the pins 7 can be entirely withdrawn or set for a maximum depth of penetration.

Figure 3:
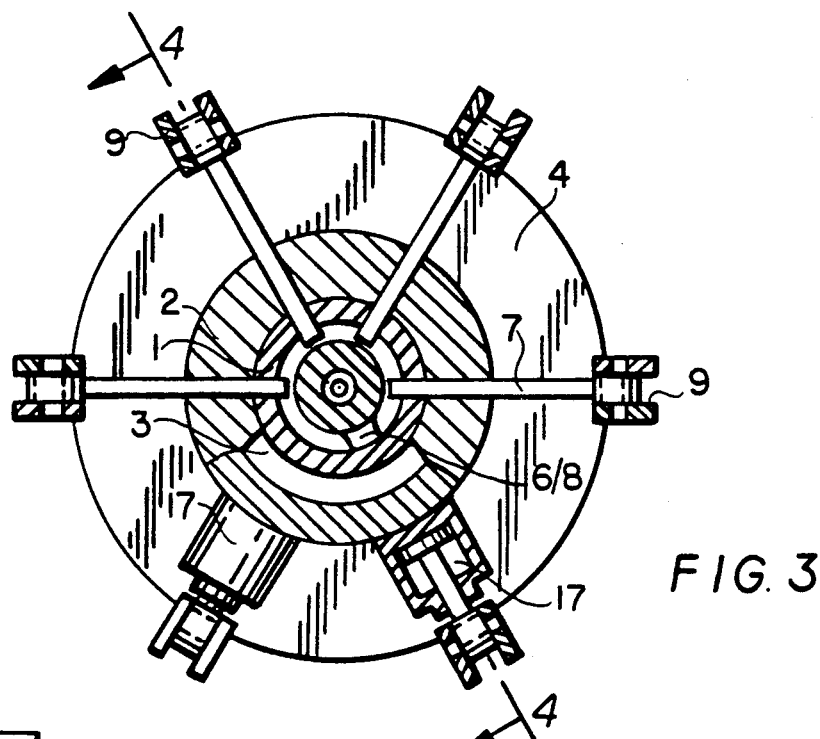
FIG. 3 is a cross section through an extruder cylinder with hydraulic control of the beams.
Figure 4:
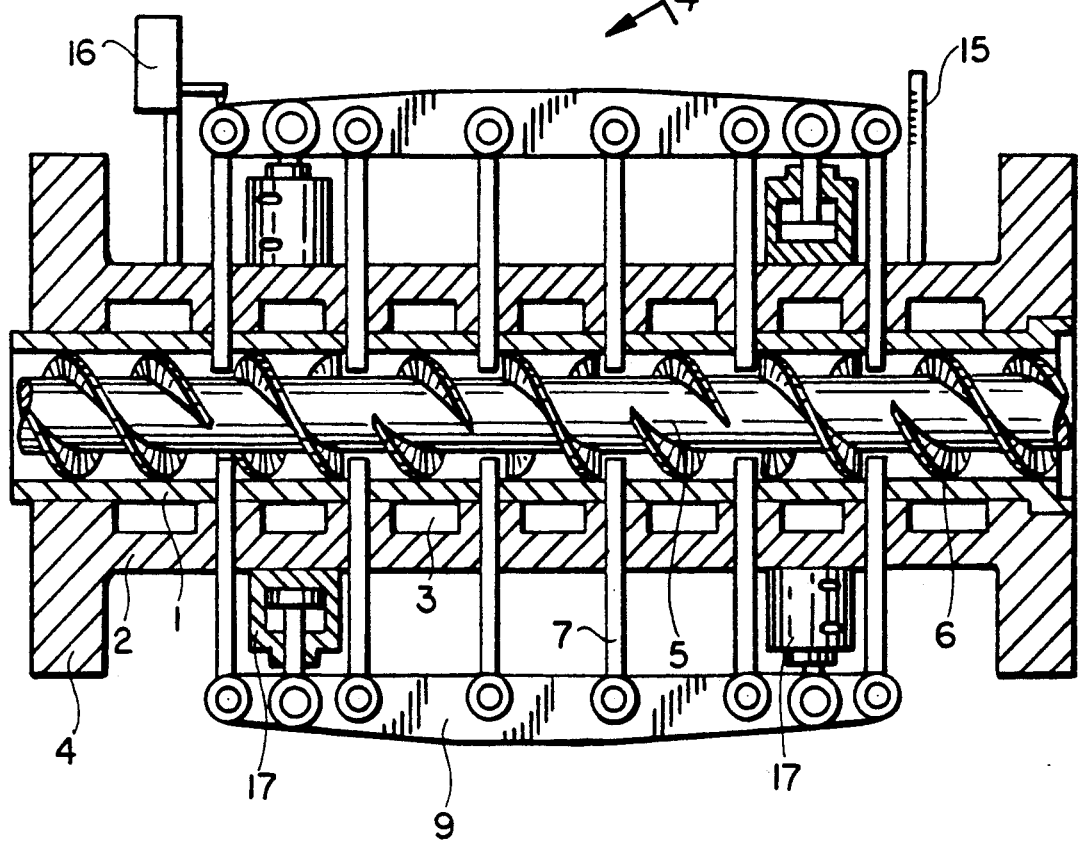
FIG. 4 is a radial section taken through the extruder cylinder of FIG. 3 along the lines 4—4.
Figure 5:
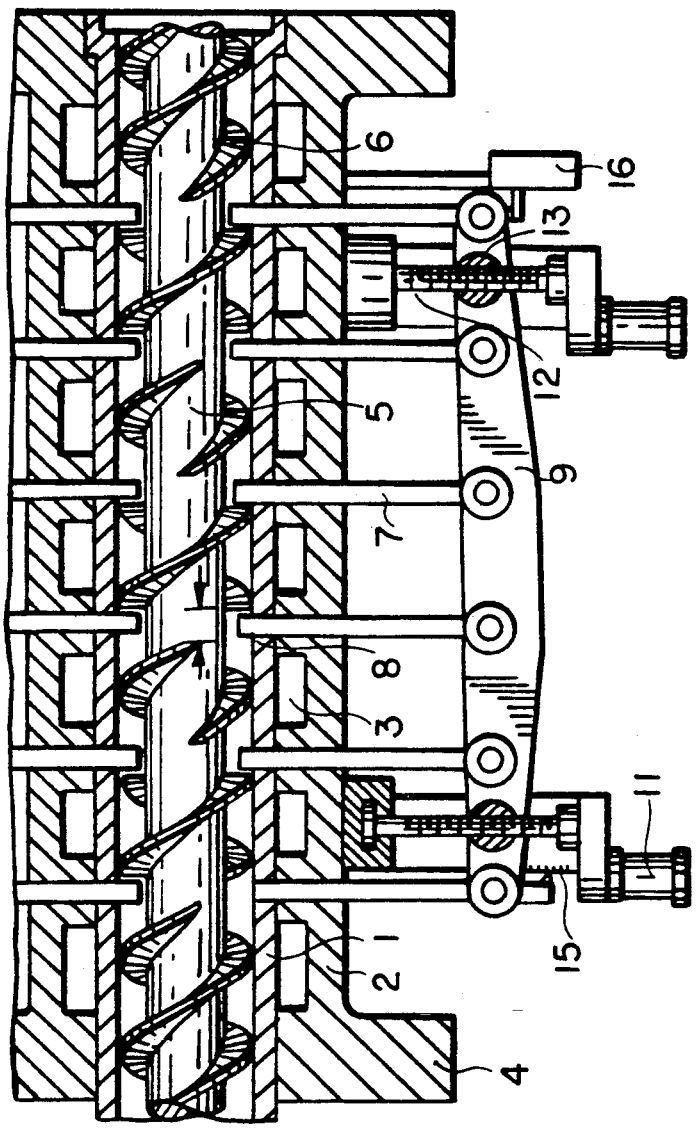
FIG. 5 is a radial section taken through the extruder cylinder of FIG. 1 along the lines 2—2 showing beam in an inclined position.
Figure 6:
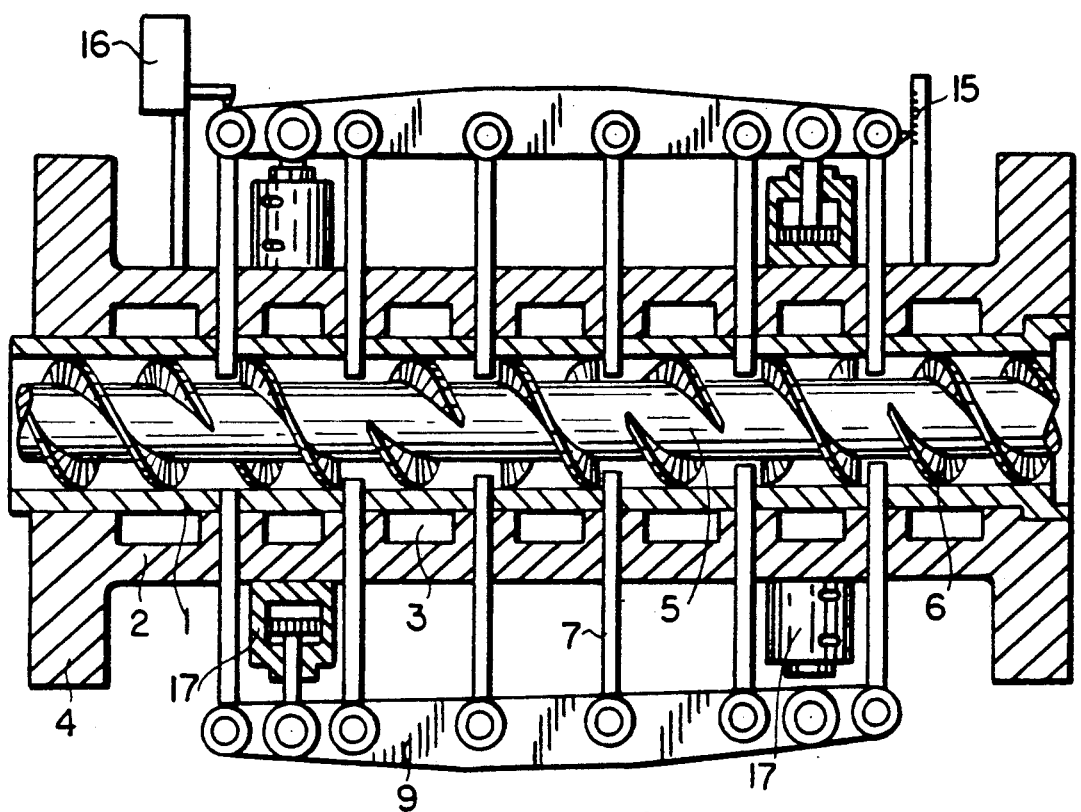
FIG. 6 is a radial section taken through the extruder cylinder of FIG. 3 along the lines 4—4 and showing the beam in an inclined position.
Figure 7:
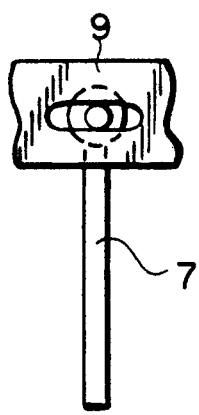
FIG. 7 is a partial view illustrating a pin fastened to the beam.

The depth of penetration can be read on a scale 15. Transducers 16 electrically detect the depth of penetration of the pins 7. In the embodiment shown in FIGS. 3 and 4 the beams are operated by means of hydraulic piston-and-cylinder units 17. Here the piston-and-cylinder units 17 are disposed each between two pins 7, resulting in a design of shorter length.

I claim:

1. A screw extruder for working plastic compositions, said extruder comprising:
    a cylinder having radially directed bore holes extending therethrough, said bore holes being disposed in at least two planes perpendicular to the cylinder axis and said bore holes of adjacent planes being aligned parallel to the axis of said cylinder;
    a rotating spiral screw disposed in said cylinder, said screw having at least two adjacent circumferential grooves forming gaps in the spiral, said gaps corresponding in position to said adjacent bore hole planes;
    pins corresponding to said bore holes, said pins being radially disposed about said cylinder and having an inner end extendible through said bore holes and into said spiral screw gaps;
    a beam fastened to an outer end of at least two pins, said at least two pins being aligned in a row parallel to said cylinder axis;
    stud means for jointly connecting said pins to said beam, said stud means being guidingly engaged in corresponding slots in said beam so as to allow angling of said beam with respect to a normally parallel adjustment of the beam and the cylinder axis; and
    two drive means disposed at opposing ends of said beam for displacing said beam, whereby said opposing beam ends are independently displaceable by said drive means, thereby controlling the depth to which said at least two pins extend into said screw gaps relative to one another.

2. The screw extruder of claim 1 wherein said drive means are electro-mechanical motors.

3. The screw extruder of claim 1 wherein said drive means are hydraulic.

4. The screw extruder of claim 1 further comprising measuring means for determining the position of said beam relative to said cylinder axis.

5. The screw extruder of claim 4 wherein said measuring means comprises scales disposed alongside a path of movement of said beam.

6. The screw extruder of claim 4 wherein said measuring means comprises transducers disposed alongside a path of movement of said beam.

7. The screw extruder of claim 1 wherein said measuring means comprises transducer means for sensing a position of said beam relative to said cylinder axis.

8. The screw extruder of claim 1 wherein said drive means are servo motors.

* * * * *